Patented May 13, 1947

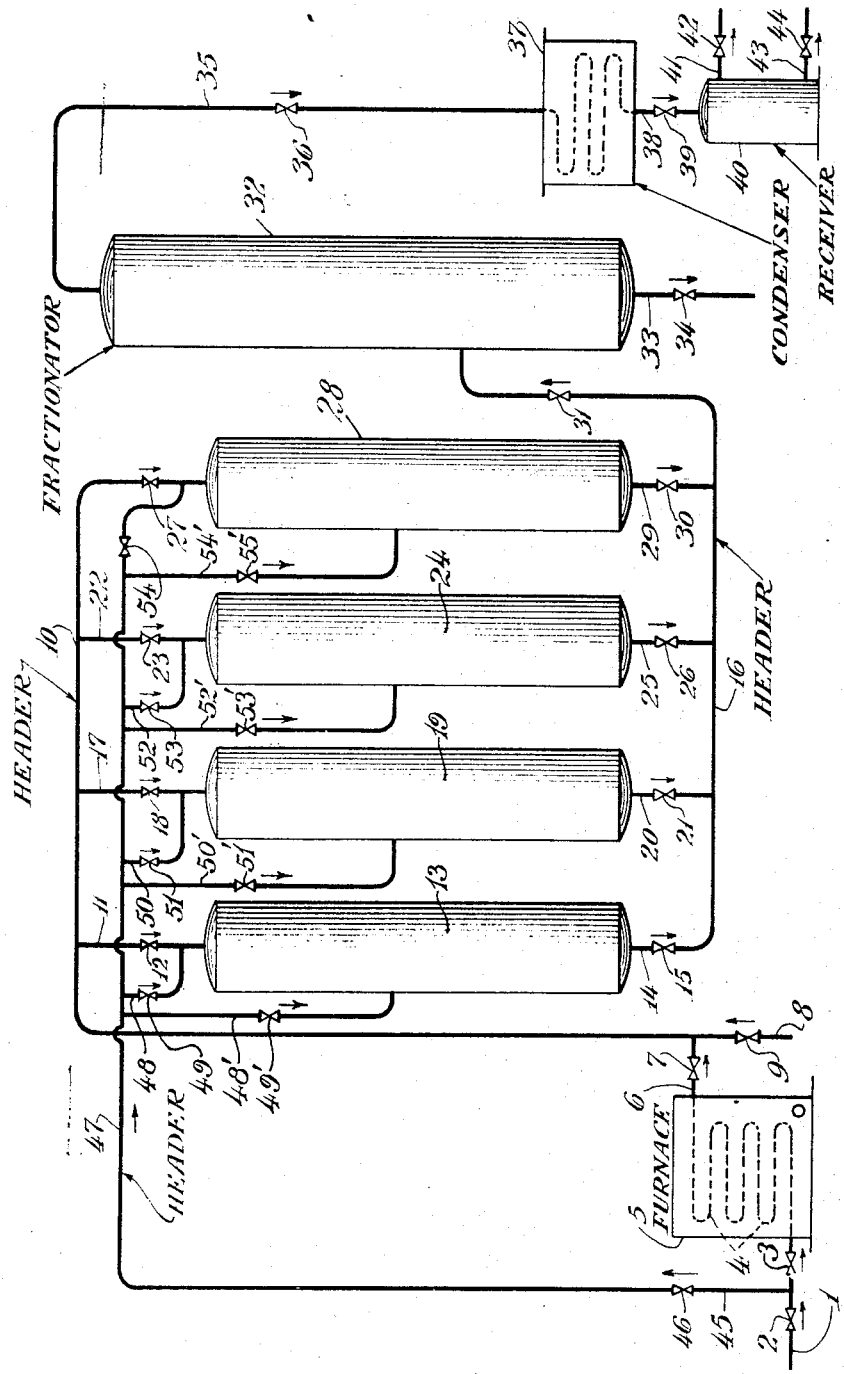

2,420,327

UNITED STATES PATENT OFFICE 2,420,327

POLYMERIZATION OF HYDROCARBONS

William B. Shanley, Chicago, Ill., assignor to Universal Oil Products Company, Chicago, Ill., a corporation of Delaware Application March 26, 1942, Serial No. 436,310

6 Claims. (Cl. 260—683.15)

This is a continuation-in-part of my copending application Serial No. 339,268, filed June 7, 1940.

This invention relates to a process for effecting the polymerization of normally gaseous olefin hydrocarbons into liquid olefins utilizable directly as high antiknock constituents of motor fuel or after hydrogenation as components of motor fuels which are required to be of a substantially saturated character such as aviation fuel.

In a more specific sense the invention is concerned with improvements in catalytic polymerizing processes operated in conjunction with petroleum cracking plants to recover motor fuel values from the gases produced incidental to cracking.

Polymerization of olefin-containing gases is carried out at the present time commercially by both thermal and catalytic methods, the former operating at relatively high temperatures and pressures and giving substantial yields of aromatics as well as olefins and the latter operating at distinctly lower temperatures and frequently lower pressures to produce a definitely olefinic product. In the catalytic processes a type of catalyst which has met with commercial success is the so-called solid phosphoric acid catalyst as described in United States Patent No. 1,993,513 and others. In this process olefin-containing hydrocarbon gas mixtures are passed through stationary beds of granular material consisting essentially of prepared particles made by incorporating a phosphoric acid with a relatively inert and generally siliceous material to produce a paste which is either calcined to produce a cake which is ground and sized to recover the catalyst particles or extruded to produce particles which are later calcined. In either case the prepared particles are subjected to a controlled steaming operation to fix the proper composition of the active polymerizing acid in respect to its degree of hydration.

In commercial plants it is customary to operate with a number of polymerizing chambers filled with this type of catalyst and it is more customary practice to operate with catalyst towers in series since the catalyst becomes spent after a period of use and needs reactivating or replacing, and since the reaction of polymerization is exothermic and cooling is frequently required between the reactors in a series to prevent an undue rise in temperature which may result in over-polymerization with the formation of undesirably high yields of polymers boiling above the gasoline range. Obviously there will be a considerable pressure drop along the line of flow through the series of catalyst towers which introduces another factor which must be considered in a successful operation of such a plant to produce optimum yields of desired products. The present process is an improvement in processes for polymerizing normally gaseous olefin hydrocarbons to form liquid polymers therefrom while utilizing solid granular catalysts, particularly the solid phosphoric acid catalysts briefly described above, although the improved process will find ready application to all similar processes of an exothermic character.

In one specific embodiment the present process consists in preheating a portion of olefin-containing hydrocarbon gases to a temperature above that necessary for efficient polymerization of the olefins in the gas mixture on passing through polymerizing catalysts, and passing the preheated material in parallel through separate beds of polymerizing catalyst after reducing the temperature of the individual streams of gases by the injection of controlled amounts of unheated charge so that the temperature of the charge entering each reactor is optimum for the production of liquid polymers in each reactor; the varied temperatures being required to compensate for catalysts of different degrees of activity.

The character of the present process is indicated in more detail by reference to the attached drawing which shows diagrammatically in general side elevation an arrangement of interconnected elements in which operations falling within the scope of the invention may be carried out. The drawing is not to scale and does not purport to contain all of the details of apparatus which may be found in commercial plants.

Referring to the drawing a charging stock which may conveniently be a so-called propane-butane fraction from the stabilizer of a cracking plant may be introduced under pressure through line 1 containing valves 2 and 3 while a portion of the charge is passed through a heating element 4 disposed to receive heat from a furnace 5 wherein it is heated to a temperature higher than that required for best operation of the parallel beds of catalyst following. As a rule temperatures of over 500° F. are not used in the polymerization of such gas mixtures with solid phosphoric acid catalyst and the charge will not ordinarily be heated above this approximate point. With a very active catalyst, either freshly prepared or freshly reactivated, temperatures as low as 250–300° F. may be employed when it is desired, for example, to selectively polymerize the more reactive olefins such as isobutene to produce special products.

The heated products from heating element 4 pass through line 6 containing valve 7 after the admission of regulated amounts of steam by way of line 8 containing valve 9 which serves to prevent loss of water from the active acid on the catalyst particles and thus extend periods of active life of the catalyst since more highly dehydrated acids than pyrophosphoric acid have a decreasing catalytic activity. The heated materials pass to a header 10 above reactors 13, 19, 24, and 28 arranged in parallel, lines 11 containing valve 12, 17 containing valve 18, 22 containing valve 23, and valve 27 at the end of header 10 permitting the introduction of the preheated charge into the polymerizers in the order named.

In accordance with the present invention a portion of the olefin-containing gas mixture bypasses heating element 4 and goes through line 45 containing valve 46 to a header 47 which has branch connections leading either into the top of the reactors or to points in the reactor intermediate in the line of flow of the reactants. Thus line 48 containing valve 49 leads from header 47 into the heated gas mixtures entering reactor 13 while another branch line 48' containing a valve 49' leads to an intermediate point in the reactor. Similarly line 50 containing valve 51 leads directly to the top of reactor 19 while branch line 50' containing valve 51' leads to a middle point thereof. In the case of reactor 24 branch line 52 containing valve 53 leads unheated quenching gases into the top of reactor 24 while branch line 52' containing valve 53' leads to an intermediate point. Lastly as shown in the drawing, the use of valve 54 permits the introduction of unheated quenching gases into the top of reactor 28 while a branch line 54' containing valve 55' leads to an intermediate point in the reactor.

It will be obvious that by the manipulation of the valves in the branch lines from header 47 that the preheated charge from header 10 may be reduced in temperature to any desired point which corresponds to optimum operation in the respective polymerizing zones. The temperatures used in any one reactor will depend upon the activity of the catalyst which in turn depends upon whether it is fresh or reactivated or partly spent and the degree of conversion desired in this particular reactor. It will be obvious that not only may different types of polymerization be conducted in individual reactors by means of the present process but that in general the overall pressure drop through the plant will be greatly reduced so that the operation is more exactly controlled and the plant is therefore more flexible. It is also obviously possible to operate different reactors under different conditions of temperature so that one may become spent ahead of the others and provide a basis for rotating the towers as the catalyst which they contain becomes successively spent at which time they may be cut out of the line of flow and either reactivated in situ by oxidizing off carbonaceous deposits and later steaming or finally disposed of as the economics of the process may warrant. Lines 14 containing valve 15, 20 containing valve 21, 25 containing valve 26 and 29 containing valve 30 permit the withdrawal of reaction products from the polymerizers 13, 19, 24, and 28 respectively into header 16 which contains a valve 31 and which leads to a fractionator 32, which is intended to represent any type of fractionating equipment which may be used to separate unreacted gases from the polymer product and permit the production of a polymer fraction of desired boiling range. As shown in the drawing, fractionator 32 has a lower draw line 33 containing a valve 34 which permits the withdrawal of polymer material heavier than that desired in the finished product and a vapor line 35 containing a valve 36 which leads to a condenser 37. The cooled products consisting of condensed liquids and gases pass through run down line 38 containing valve 39 to a final receiver 40 which permits separation of gases and liquids, the former being withdrawn through line 41 containing valve 42 and the latter through line 43 containing valve 44. Although not indicated in the drawing the gases separated from receiver 40 may be recycled to further treatment to effect further polymerization of any olefins which may have escaped reaction from the first passage through the catalyst bed.

It will be seen from the preceding description of the invention that the process thereof can be operated in a variety of ways upon different charging stocks to produce a variety of products so that it is not possible to completely indicate the commercial possibilities of the process by a single example. However, the succeeding data is illustrative although it is not introduced with the intention of unduly limiting the proper scope of the invention.

A plant of the general character described in connection with the drawing is utilized to polymerize a butane-propane fraction which contains about 35% by volume of so-called higher olefins, including propene and butenes, the remainder of the constituents being principally propane and butanes. The charge is preheated to a temperature of 405° F. and passed in parallel through three reactors containing solid phosphoric acid catalyst, the fourth in the series being in the reactivation cycle. The three reactors contain catalyst of varying activity. The first reactor contains a catalyst from a second previous reactivation and is of moderate to low activity. The second reactor contains a catalyst reactivated after an immediately preceding cycle and is somewhat more active than the catalyst in the first reactor. The third reactor contains freshly reactivated catalyst which has a relatively high activity comparable with freshly prepared catalyst. Cooling of the inlet stream to the second of the three reactors is done by introducing an unheated charge at the inlet of the reactors while cooling of the third reactor is done by introducing controlled amounts of the unheated charge at both the inlet and a central point in the reactor since there will be a tendency for the greatest temperature increase to occur in this reactor containing the most active catalyst. For the gas mixture treated it is found that the best results in overall yields are obtained while the average temperature throughout each reactor is 435° F. The following tabulation shows the inlet and the exit temperature of the three reactors during the first period of a run:

| | 1st Reactor | 2nd Reactor | 3rd Reactor |
|---|---|---|---|
| Temperature, ° F.: | | | |
| Inlet | 405 | 400 | 390. |
| Middle | 435 | 435 | Before quench 450. After quench 430. |
| Outlet | 465 | 470 | 470. |
| Average | 435 | 435 | 435. |

It will be observed that by the combination of preheating and quenching at the entrance to the second reactor and at both the entrance and at the middle point of the third reactor containing freshly reactivated catalyst that all three reactors are held at an average temperature which produces maximum olefin conversion and that this result is obtained without exceeding 475° F. which is regarded as the maximum useful outlet temperature. If preheating and quenching are not employed, the proper average temperature will only be obtained on reactor 1 with reactor 2 operating above the desired average and reactor 3 operating above the desired average with an outlet temperature well above the desired useful maximum.

There is produced by this type of operation over the period stated seven gallons of polymer material per 1000 cu. ft. of inlet gas, the mixed polymers having an octane number of 82 by the motor method. The ultimate production per pound of catalyst is 60 gallons.

I claim as my invention:

1. A process for producing polymers from a normally gaseous olefinic charging stock which comprises passing an olefinic gas stream through a bed of relatively active polymerizing catalyst, simultaneously passing a second stream of olefinic gas through a bed of less active polymerizing catalyst, heating a portion of said charging stock to a temperature suitable for effecting polymerization in the second-mentioned bed and supplying separate portions of the heated gas to said beds, and commingling an unheated portion of said charging stock with the heated gas being supplied the first-mentioned catalyst fed in sufficient amount to maintain in the more active catalyst bed an average polymerizing temperature substantially uniform with the average polymerizing temperature prevailing in the less active catalyst bed.

2. A process for producing polymers from a normally gaseous olefinic charging stock which comprises passing an olefinic gas stream through a bed of fresh solid phosphoric acid catalyst, simultaneously passing a second stream of olefinic gas through a bed of partially spent solid phosphoric acid catalyst, heating a portion of said charging stock to a temperature suitable for effecting polymerization in the second-mentioned bed and supplying separate portions of the heated gas to said beds, and commingling an unheated portion of said charging stock with the heated gas being supplied to the first-mentioned catalyst bed in sufficient amount to maintain in the more active catalyst bed an average polymerizing temperature substantially uniform with the average polymerizing temperature prevailing in the less active catalyst bed.

3. A process for producing polymers from a normally gaseous olefinic charging stock which comprises maintaining under polymerizing conditions a first bed of relatively active polymerizing catalyst and a second bed of less active polymerizing catalyst, heating a portion of said charging stock to a temperature suitable for effecting olefin polymerization in said second bed and supplying separate portions of the heated gas to said beds, and introducing to said first bed an unheated portion of said charging stock in sufficient amount to maintain in the first bed an average polymerization temperature substantially uniform with that prevailing in the second bed.

4. The process as defined in claim 3 further characterized in that at least a portion of said unheated charging stock is commingled with the heated gas being supplied to said first bed.

5. The process as defined in claim 3 further characterized in that at least a portion of said unheated charging stock is introduced at an intermediate point of said first bed.

6. A process for producing polymers from a normally gaseous olefinic charging stock which comprises maintaining under polymerizing conditions a first, a second and a third bed of polymerizing catalyst, said beds being of decreasing catalytic activity in the order named, heating a portion of the charging stock to a temperature suitable for effecting olefin polymerization in said third bed of lowest catalytic activity, supplying separate portions of the heated gas to said beds, commingling unheated portions of the charging stock with the heated gas being supplied to the first and second beds, and introducing a further unheated portion of the charging stock at an intermediate point of said first bed of highest catalytic activity, the amount of unheated charging stock thus supplied to the first and second beds being sufficient to maintain in each of these beds an average polymerizing temperature substantially uniform with that prevailing in said third bed.

WILLIAM B. SHANLEY.

REFERENCES CITED

The following references are of record in the file of this patent:

UNITED STATES PATENTS

| Number | Name | Date |
| --- | --- | --- |
| 2,222,304 | Simpson et al. | Nov. 19, 1940 |
| 2,165,631 | Gerhold | July 11, 1939 |
| 2,154,795 | Westenberg | Apr. 18, 1939 |
| 2,040,658 | Kuentzel et al. | May 12, 1936 |
| 2,186,275 | Story | Jan. 9, 1940 |
| 2,096,204 | Seguy | Oct. 19, 1937 |
| 2,198,545 | Levine | Apr. 23, 1940 |
| 2,245,735 | Subkow | June 17, 1941 |
| 2,266,095 | Thayer | Dec. 16, 1941 |
| 2,198,180 | Rubin | Apr. 23, 1940 |
| 2,268,618 | Pyzel | Jan. 6, 1942 |
| 2,242,627 | Strickland | May 20, 1941 |
| 2,170,275 | Nelson | Aug. 22, 1939 |
| 2,373,888 | Hachmath | Jan. 30, 1945 |
| 2,368,110 | Buell | Jan. 30, 1945 |

FOREIGN PATENTS

| Number | Country | Date |
| --- | --- | --- |
| 451,788 | Great Britain | Aug. 12, 1936 |
| 456,637 | Great Britain | Nov. 12, 1936 |